June 23, 1964     C. V. STROMBERG     3,138,011
VIBRATION DAMPER ASSEMBLY
Filed Aug. 17, 1962     2 Sheets-Sheet 1
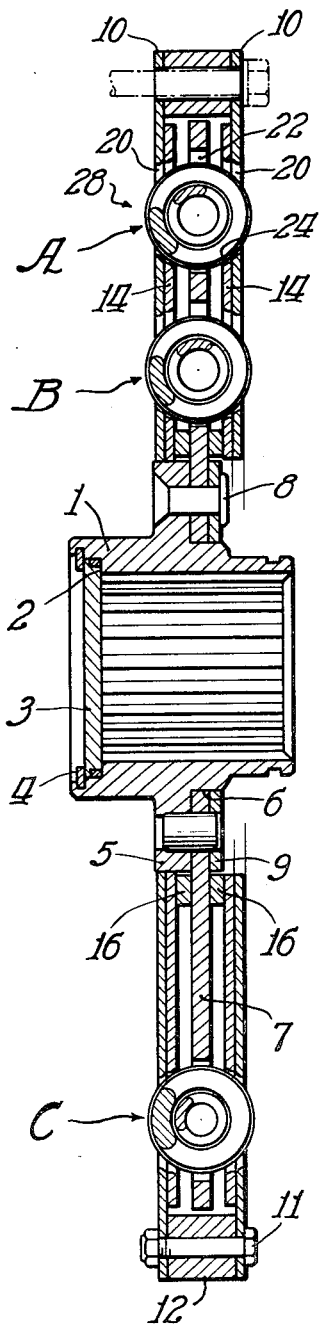
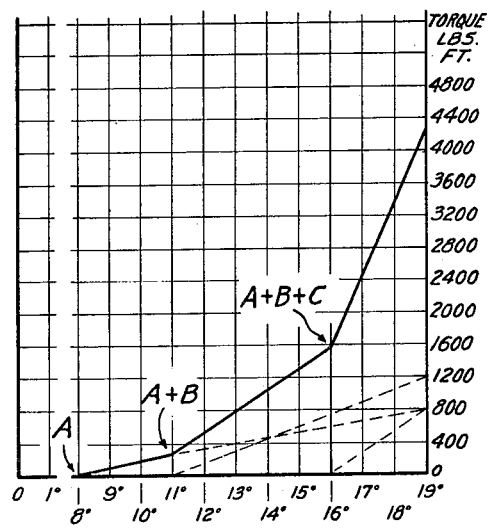
Inventor:
Clinton V. Stromberg
By: Thomas B. Hunter Atty

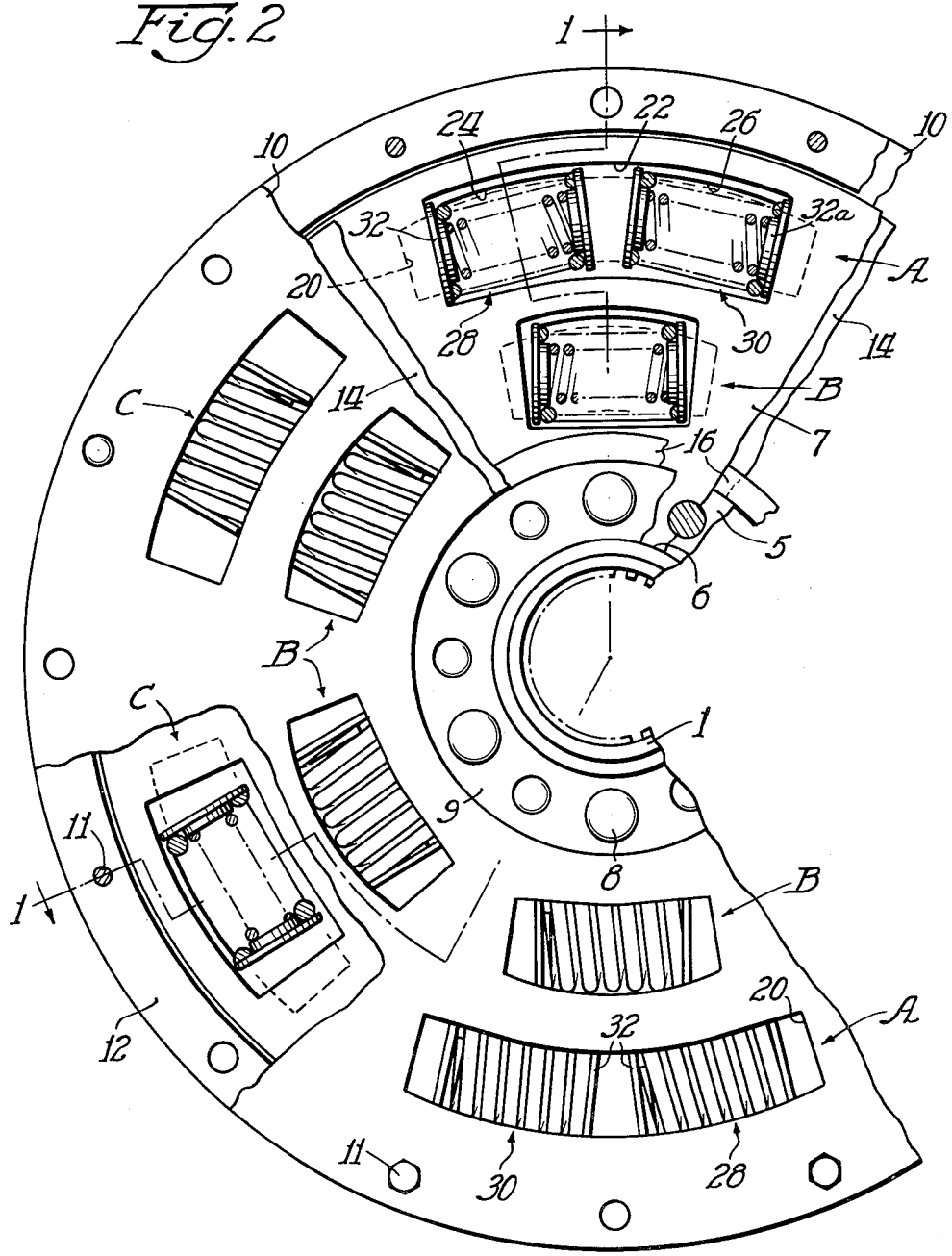

United States Patent Office 3,138,011
Patented June 23, 1964

3,138,011
VIBRATION DAMPER ASSEMBLY
Clinton V. Stromberg, Allen Park, Mich., assignor to Borg-Warner Corporation, a corporation of Illinois
Filed Aug. 17, 1962, Ser. No. 217,607
7 Claims. (Cl. 64—27)

This invention relates in general to vibration damper assemblies and more particularly to heavy-duty damper assemblies adapted for use in the drive systems of large vehicles, such as tractors, dozers, graders, and the like.

Vibration damper units of the general type to which the present invention pertains are described and illustrated in applicant's copending U.S. application, Serial No. 172,547, filed February 12, 1962 (now U.S. Patent No. 3,101,600). This type of unit includes a hub assembly adapted to be driven through resilient means in the form of a series of spring units by drive plates which engage the spring units when torque is applied to the plates. More specifically, in the aforementioned copending application, a number of vibration damper mechanisms are described which embody the principle of transmitting torque in series through at least two sets of resilient means or spring units to the hub.

The present invention proposes to utilize a more simplified design, particularly adapted for use in large damper units having diameters on the order of 18″–24″, without sacrificing the improved torque load deflection characteristics of the aforementioned damper assemblies. In order to accomplish this, several novel features are incorporated into the present design which contribute to an over-all improved construction.

Basically, the damper assembly forming the subject matter of the present invention comprises a pair of spaced, annular members or drive plates, a pair of floating spring retainer plates disposed between the drive plates, a hub having a flange or plate member between the floating spring retainer plates, and a plurality of apertures in each of the aforementioned elements for receiving a plurality of resilient means for transmitting torque from the drive plates to the hub flange, and vice versa. The apertures in the hub flange and drive plates furnish engageable means provided by the opposed edge portions of said apertures or windows which are adapted to engage or abut the ends of springs received therein as the drive and driven members are rotated relative to one another.

The length of each of the aforementioned apertures in the drive plates, the hub flange, and the spring retainer plates and the normal or free length of the springs is important because the assembly is designed to have a certain amount of freedom or play before any of the spring units are engaged. Also, a plurality of groups of spring units, each having a different spring rate, are designed to be engaged in sequence so that rate of deflection decreases as the torque load increases.

It is therefore an object of the present invention to provide an improved heavy-duty vibration damper assembly.

It is another object to provide a damper assembly including a plurality of groups of springs which are sequentially engaged as torque loading is applied and an improved means for supporting the springs within the assembly.

Other and more particular objects and advantages will become apparent from the following description and the appended drawings in which—

FIGURE 1 is a cross-sectional view of a vibration damper assembly constructed in accordance with the principles of the present invention taken along the plane of line 1—1 of FIGURE 2;

FIGURE 2 is a partial plan view with portions broken away for clarity; and

FIGURE 3 is a graph illustrating a typical torque vs. deflection curve.

Referring now to the drawings, particularly FIGURE 1, a vibration damper assembly is shown including a hub member 1 having an internally splined bore to receive a driven shaft (not shown). The hub member is provided with an annular recess 2 which is adapted to receive an end closure 3 secured by a conventional retainer ring 4.

Hub member 1 further includes a radially extending rim 5 and a shoulder 6 receiving an annular flange 7 which is connected to the hub by rivets 8 and retainer ring 9, or by some other suitable means. It should be understood, however, that the driven plate and the hub could be fabricated in a single, integral unit.

A pair of annular drive plates 10, connected together in spaced relation at their radially outermost edges by a series of bolts 11 extending through spacer ring 12, are disposed in generally parallel relation with respect to the driven plate 7 with one drive plate on each side thereof. Floating spring retainer plates 14 are located between each drive plate 10 and the hub flange 7 and are spaced from the latter by a pair of spacer washers 16.

As perhaps best shown in FIGURE 2, the drive plates, the spring retainer plates, and the driven plate are all provided with a plurality of groups of generally registered spring receiving apertures or windows, each group being designated by the letters A, B, and C respectively. For convenience, the term "set" refers to an aggregation of apertures which cooperate with each other to form a pocket or recess for the reception of one or more spring assemblies; the term "group," on the other hand, refers to one or more aperture sets having the same general relationship with respect to the dimensions of the apertures in the drive plates, the driven plate and the spring retainer plates forming a single set.

In a preferred embodiment, group A consists of two sets of apertures diametrically opposed from each other, each set comprising an elongated, arcuate aperture 20 in each of the drive plates, an aperture 22 in the driven plate 7, and a pair of circumferentially spaced, registered spring retaining apertures 24, 26 in each of the floating plates 14.

Resilient means in the form of spring assemblies 28, 30, which may consist of a pair of helical compression springs arranged in a coaxial set, are received in the spring retaining apertures 24, 26 respectively in the floating plates 14, 14 with their end portions engaging a pair of spring seats 32. The spring seats 32 are in the form of cylindrical disc-like members having a thickened central portion or boss 32a which serves to locate the springs. The other side of each spring seat is normally in engagement with the ends of the floating spring retainer plate apertures. In other words, the floating plates 14, 14 provide supporting means for supporting the resilient means or spring assemblies 28, 30 independently of the driving and driven members.

The aperture sets of group B and group C are symmetrically arranged about the central axis of the damper assembly with the former being spaced radially inwardly of groups A and C. Essentially, the arrangement of these sets is identical to that described in connection with the sets of group A, with the exception that there is only one spring assembly associated with each said set in groups B and C.

The springs of groups A, B, and C tend to hold the two retainer plates in the same position relative to one another so that they float as a unit relative to the hub flange and the drive plates.

As mentioned in the preliminary remarks, the relationship between the length of each of the apertures in the drive plates, the driven plate, and the floating retainer plates is very important. More specifically, the preferred arrangement is such that a certain amount of relative movement between the driving and driven members is permitted before any of the resilient means are engaged by the edges of the apertures in the drive and driven plates respectively. In the preferred embodiment, the drive plates are designed to permit a total of 8° of angular movement relative to the hub flange prior to the engagement of any springs. If, for example, the drive plates are rotated counterclockwise relative to the driven plate (as viewed in FIGURE 2), one end of each of the apertures in said drive plates engages the spring seats securing springs 30 in group A after 8° of angular movement. Torque is thus transmitted from the drive plates to springs 30, through the floating retainer plates to springs 28, and from said springs 28 to the flange connected to the hub. The deflections of springs 28 and 30 are additive and yield a total angular amplitude, in one direction, of 11°. In effect, the two springs 28 and 30 in group A function as a single spring with the load evenly distributed between the two springs in each set. It should be understood that in a smaller unit, the double springs in series could be replaced by a single spring.

The springs of group B transmit a load to the driven hub plate only after the spring combination of group A, namely springs 28 and 30, have accumulated 3° of angular movement, approximately 1½° for each spring. The springs of group B yield to total angular deflection of 8° in one direction.

The springs of group C are designed to transmit the load only after the springs of group A have accumulated 8°; at this point the springs of group B will have accumulated a total of 5° (8°−3°=5°). Springs of group C yield a total amplitude of 3° in one direction.

Illustrated in FIGURE 3 is a torque vs. deflection graph of a typical installation. It should be emphasized that a large degree of latitude is permissible in the selection of springs having different rates. It will be noted from the graph that the spring rates of groups A, B, and C are progressively higher in the example given, so that the effective total rate (shown in the solid line) is analogous to an exponential curve.

In summary, after 8° of free movement, the springs of group A engage; after 3° more, the springs of group B engage; and after 5° more, the springs of group C engage. It is obvious that the total maximum angular deflection in one direction is 19°.

Having thus described the present invention, it is apparent that a novel and improved vibration damper assembly has been provided, which is especially adapted for heavy-duty operation. While the invention has been described with reference to a particular embodiment, it should be understood that this is by way of example rather than limitation; and it is intended that the invention be defined by the appended claims which should be given a scope as broad as consistent with the prior art.

What is claimed is:
1. A vibration damper assembly comprising—
   a rotary driving member;
   a rotary driven member;
   resilient means adapted to transmit torque from said driving member to said driven member;
   supporting means for supporting said resilient means independently of said driving and driven members;
   engageable means associated with said driving and driven members adapted to be engaged by said resilient means;
   said engageable means being arranged so that limited relative movement between said driving member and said driven member is permitted before said driving member engages said resilient means and said resilient means engages said driven member.

2. A vibration damper assembly as defined in claim 1 wherein—
   said resilient means comprises a spring having end portions adapted to engage said driving member and said driven members as torque is applied to said driving member.

3. A vibration damper assembly as defined in claim 2 wherein—
   said driving member comprises a generally plate-like element; and
   said driven member comprises a plate-like element arranged generally parallel to and spaced from said driving member.

4. A vibration damper assembly as defined in claim 1 wherein—
   said engageable means comprises means defining a first aperture in said driving member and means defining a second aperture in said driven member, said first and second apertures being normally registered; and
   said resilient means comprises a spring carried by said supporting means and disposed within said first and second apertures, said spring having end portions adapted to sequentially engage the ends of said first and second apertures when said driving member is rotated relative to said driven member.

5. A vibration damper assembly comprising:
   a hub member having an annular, radially extending flange;
   a pair of annular drive plates, said drive plates being disposed on opposite sides of said hub flange;
   means connecting said drive plates together at their radially outermost edges for conjoint rotation relative to said hub flange;
   a pair of floating spring retainer plates, each retainer plate being disposed between said hub flange and a different one of said drive plates;
   means defining a plurality of groups of apertures in said damper assembly, each aperture group including a set of generally registered apertures in said hub flange, said drive plates, and said spring retainer plates, said apertures being elongated and having circumferentially spaced engageable edges on opposite ends thereof;
   a pair of spring seats associated with each said floating retainer plate aperture, each having one side thereof in engagement with the circumferentially spaced edges of each said retainer plate aperture; and
   a compression spring seated on each pair of spring seats, the dimensions of said springs and said apertures being such that when said pair of drive plates is rotated relative to said hub flange the springs associated with each group of apertures are sequentially engaged and limited movement of said drive plates relative to said hub flange is permitted before any of said springs is engaged.

6. A vibration damper assembly comprising:
   a hub member having an annular, radially extending flange;
   a pair of annular drive plates, said drive plates being disposed on opposite sides of said hub flange;
   means connecting said drive plates together for conjoint rotation relative to said hub flange;
   a pair of floating plates, each said floating plate being disposed between said hub flange and a different one of said drive plates and arranged for independent movement relative to said drive plates and said hub;
   first engageable means carried by said hub member;
   second engageable means carried by said drive plates;
   a resilient assembly independently supported by said floating plates, said resilient assembly adapted to be engaged by and compressed between said first and second engageable means when said drive plates are rotated relative to said hub member, the normal length of said resilient assembly being less than the normal spacing between said first and second engageable means whereby a limited amount of relative motion between said drive plates and said hub member is permitted before said resilient assembly is engaged.

7. A vibration damper assembly comprising:

a hub member having an annular, radially extending flange;

a pair of annular drive plates, said drive plates being disposed on opposite sides of said hub flange;

means connecting said drive plates together for conjoint rotation relative to said hub flange;

a pair of floating plates, each said floating plate being disposed between said hub flange and a different one of said drive plates and arranged for independent movement relative to said drive plates and said hub;

means defining a plurality of aperture sets in said damper assembly, each aperture set including genenerally registered apertures in said hub flange, said drive plates, and said floating plates, said apertures being elongated and having circumferentially spaced engageable edges on opposite ends thereof;

a resilient assembly received within each of said aperture sets, said resilient assemblies being supported by said floating plate apertures and having end portions engageable with the spaced engageable edges of the apertures in said hub flange and said drive plates as said drive plates are rotated relative to said hub member, the length of the apertures in said floating plates being less than the length of the corresponding apertures in said hub flange and drive plates to permit a limited amount of relative motion between said drive plates and said hub member before any of said resilient assemblies are engaged.

References Cited in the file of this patent

UNITED STATES PATENTS

| | | |
|---|---|---|
| 2,097,627 | Lewis | Nov. 2, 1937 |
| 2,220,566 | Wood | Nov. 5, 1940 |
| 2,632,318 | Meyer | Mar. 24, 1953 |
| 2,745,268 | Reed | May 15, 1956 |
| 2,895,316 | Kloud | July 21, 1959 |
| 2,920,733 | Lysett | Jan. 12, 1960 |
| 2,984,091 | Ludwig | May 16, 1961 |